Sept. 10, 1935.   F. D. HANSEN ET AL   2,013,913
METAL COVER FOR AUTOMOBILE TIRES
Filed May 18, 1931   4 Sheets-Sheet 3
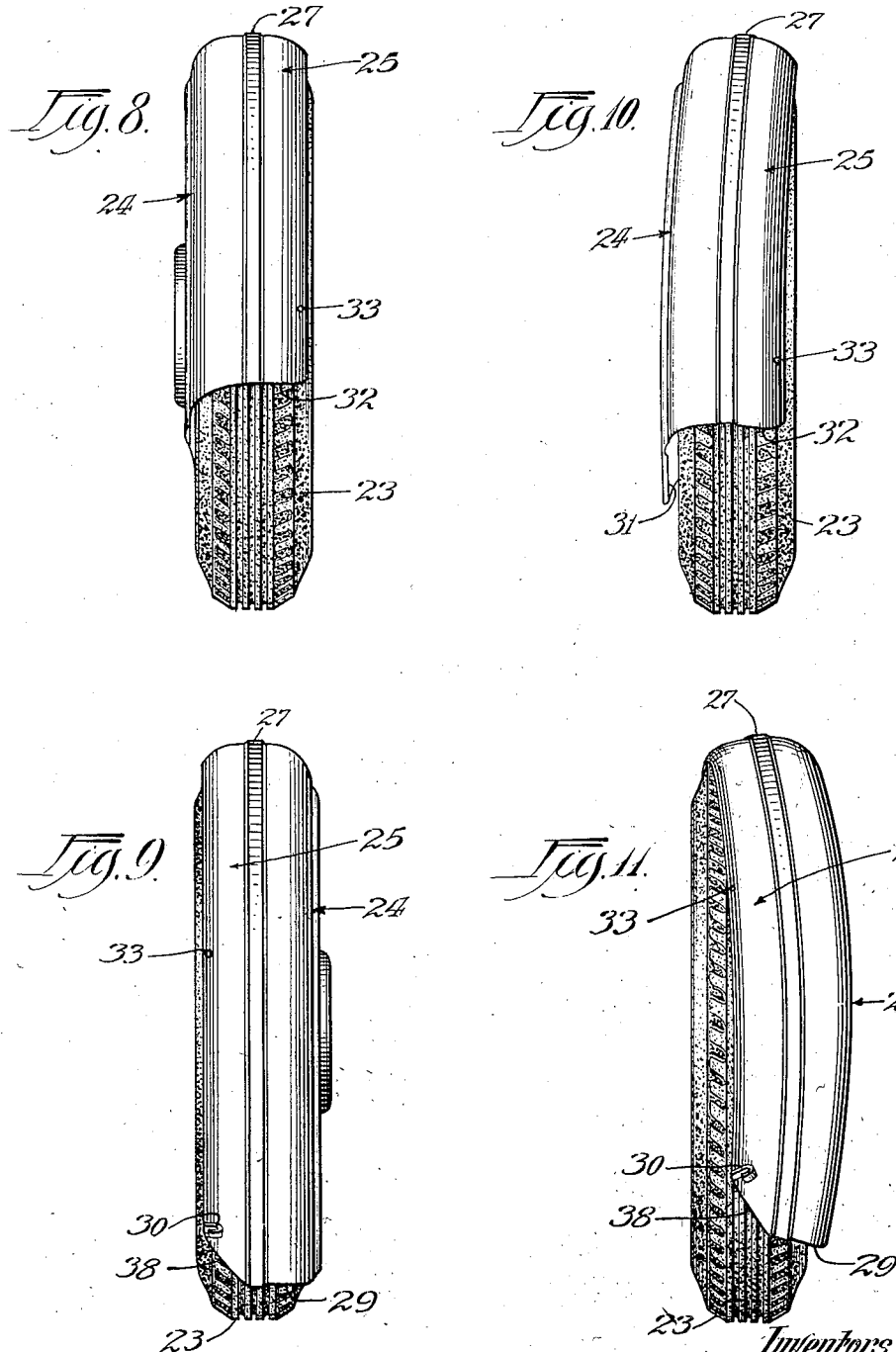

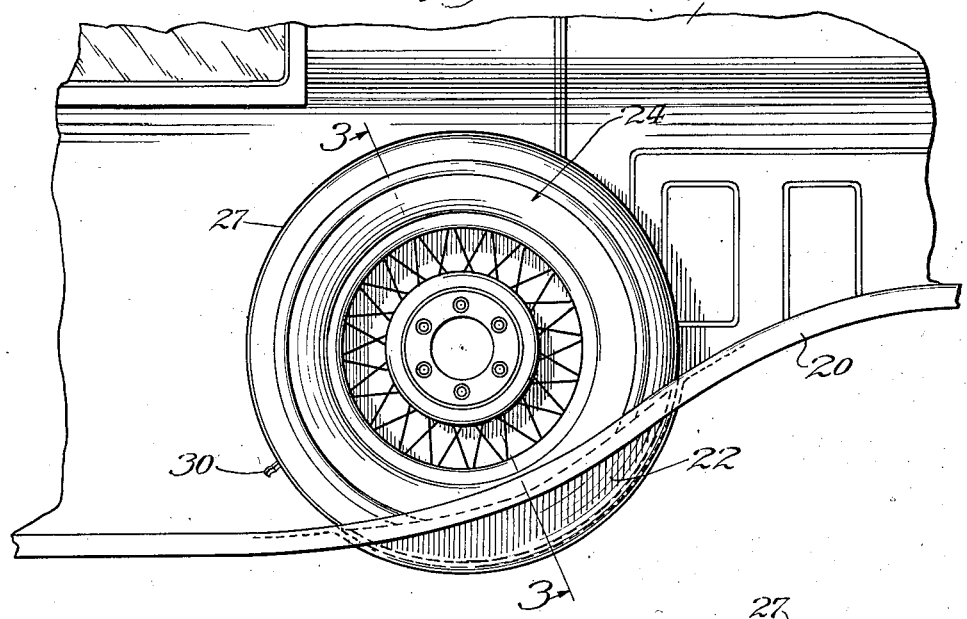
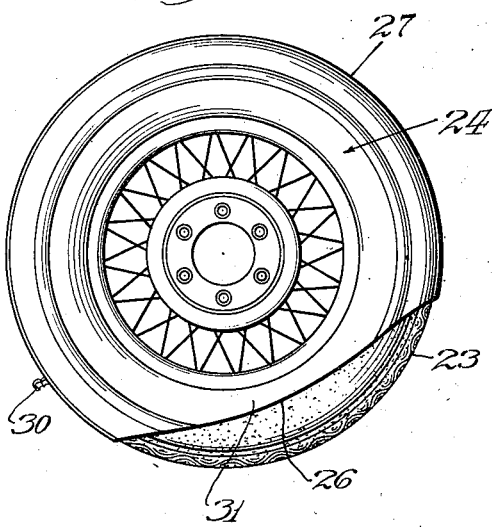
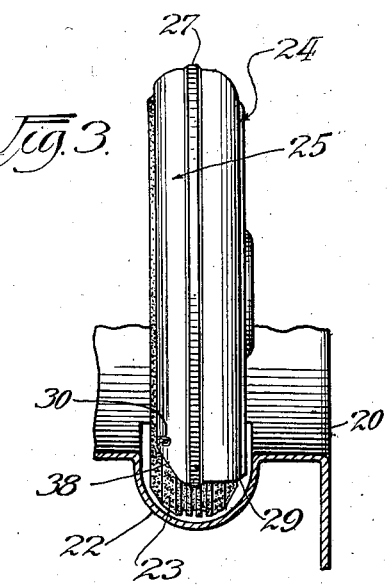

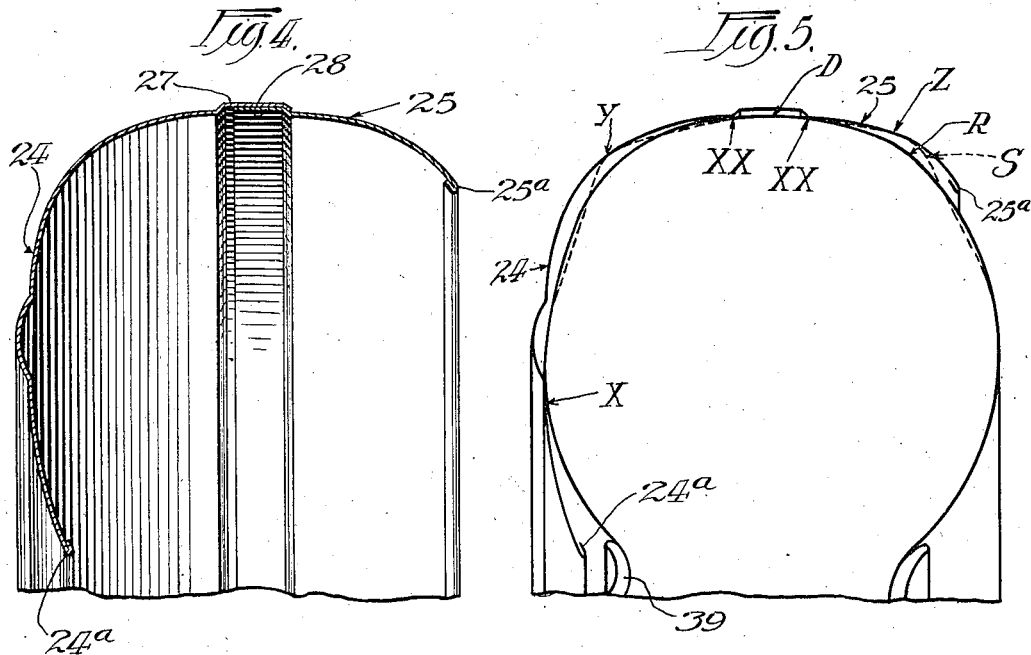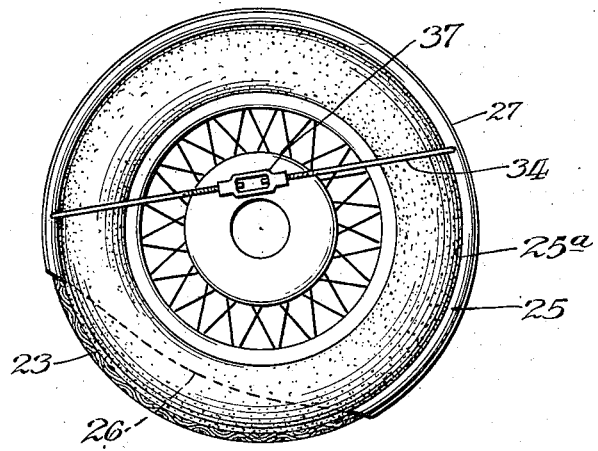

Sept. 10, 1935.　　　F. D. HANSEN ET AL　　　2,013,913
METAL COVER FOR AUTOMOBILE TIRES
Filed May 18, 1931　　　4 Sheets-Sheet 4
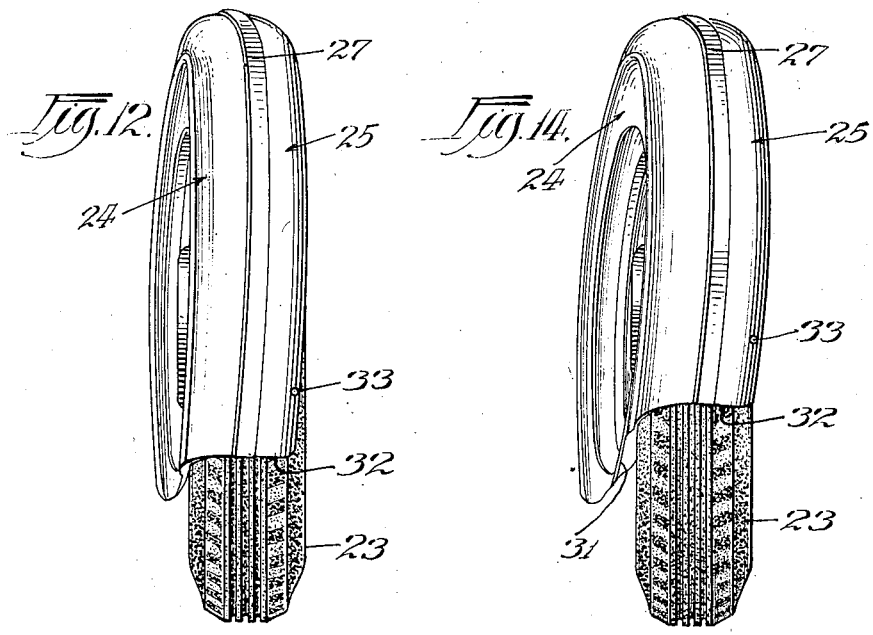
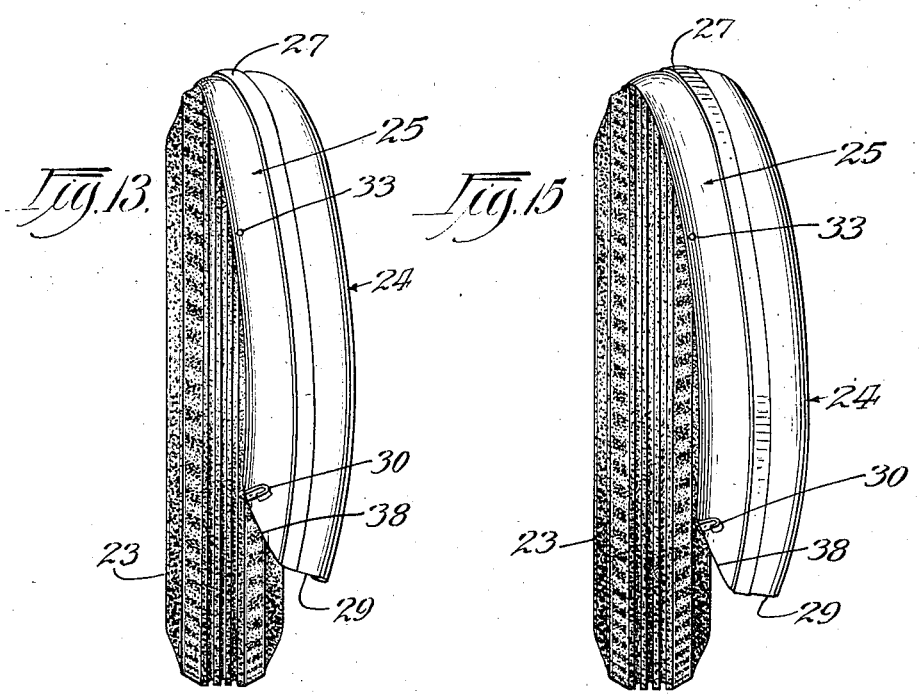

Patented Sept. 10, 1935

2,013,913

UNITED STATES PATENT OFFICE 2,013,913

METAL COVER FOR AUTOMOBILE TIRES

Frederick D. Hansen and Herbert W. Tinker, Milwaukee, Wis., assignors, by mesne assignments, to Lyon Incorporated, Detroit, Mich., a corporation of Delaware Application May 18, 1931, Serial No. 538,180

8 Claims. (Cl. 150—54)

Our invention relates to metal covers for automobile tires, or the like.

It is desirable from maximum tire-protection and appearance standpoints that spare tire covers conform closely in size and shape to the size and shape of the tire; and the principal object of our invention is to provide a simple, inexpensive and unitary all-metal tire cover embodying this desirable feature, which cover is adapted to substantially form-fit the tire.

A further object is to provide a metal tire cover having a front portion and a tread portion conforming approximately to the transverse and circumferential curvatures of the tire, the transverse tread portion having a curvature closely approximating the transverse curvature of the tire and closely fitting the tire on both sides of its circumferential center line, and also having a parti-circular shape in circumferential direction with its ends engaging the tire below the diameter of the latter.

Another object is to provide a cover of the foregoing character which may be easily and quickly applied to and removed from the tire without removing the tire from its mount, but which is removable and replaceable on the tire only by progressive twist-movement of the cover from end to end generated by movement only of one end of the cover.

A further object is to provide a unitary cover formed of slightly flexible metal which is adapted normally to self-secure itself upon the tire without the aid of separate or additional fastening means, its ability to remain self-secured upon the tire being derived from its transverse and circumferential curvatures relative to the corresponding tire curvatures.

A further and more specific object is to provide a unitary cover formed of slightly flexible metal to substantially conform to the transverse and circumferential curvatures of the tire with its transverse portion adapted to assume a position in close proximity to the tire, said cover having a completely circular tire-face-covering portion and an integral tire-tread-covering portion with the diameters of the opposite free edges of said cover portions sufficiently less than the maximum tread-diameter of the tire that, normally, the cover cannot be placed on or removed from the tire without distortion of the same to vary the normal diameter of one of its side edges.

Our invention is well adapted for use with fender-well-mounted spare tires; and another object of our invention is to provide a cover which fits the tire with sufficient closeness that it extends down into the fender-well where its lower edges are substantially concealed, all without affecting the ease and the readiness of removal or replacement of the cover upon the tire while the tire remains mounted in the fender-well.

It will also be appreciated that as tires wear, or due to under-inflation of the tire, the maximum tread diameter may be reduced; and a further object of our invention is to provide means which can be readily and quickly applied to the cover, and adjusted within itself for drawing the tread-covering portion of the cover down into closer tire-seated position, if wear and inflation conditions require it.

Other objects and advantages will become apparent as the following description progresses and by reference to the drawings, wherein:

Figure 1 is a partial, front-elevational view of an automobile and illustrating my invention as applied to a fender-well-mounted spare tire;

Fig. 2 is a separated, front elevational view of the tire and cover shown in Fig. 1;

Fig. 3 is a partial, sectional view taken substantially on line 3—3 of Fig. 1;

Fig. 4 is an enlarged transverse section of the tire cover shown in previous figures;

Fig. 5 is a diagrammatic view indicating normal positions which the cover may assume upon conventional, so-called, round-tread and square-tread types of tires;

Fig. 6 is a rear elevational view of the tire-and-cover structure shown in Fig. 2 and illustrating adjustable means (in addition to the shape of the cover itself) which may be employed for additionally securing the cover upon the tire;

Fig. 7 is a detail sectional view illustrating the manner of engagement of the fastening means (of Fig. 6) with the cover;

Figs. 8 and 9 are companion, diametrically-opposed, end-elevational views showing the cover in fully-seated position upon the tire;

Figs. 10 and 11 are views similar, respectively, to Figs. 8 and 9 but illustrating the position of the cover upon the tire in one of its preliminary stages of removal;

Figs. 12 and 13 are similar, respectively, to Figs. 10 and 11, except showing the cover in a further advanced stage of removal; and Figs. 14 and 15 are views similar, respectively, to Figs. 12 and 13, except showing the cover in condition ready to be lifted as a whole from the tire.

It is to be understood that, while we have illustrated our invention as applied to a fender-well-mounted tire, we do not wish to be limited to such an arrangement since it is obvious that it may well serve to cover tires mounted in the various well known ways at the side or rear of the automobile.

Referring particularly to the drawings, the fender 20 of the automobile 21 is provided with a well 22 in which the lower part of the wheel-supported tire 23 projects (Fig. 3) with the tire spaced sufficiently from the wall of the well to prevent it from contacting the same under ordinary operating conditions. The tire is protected by a cover having a completely circular front portion 24 and a rearwardly-extending integral tread-covering portion 25. The tread-covering portion 25 is parti-circular in circumferential direction and is of such length circumferentially that both of its ends project considerably below the diameter of the tire. The front portion 24 has its lower part cut away on a line extending between the ends of the tread-covering portion, as at 26, giving to the cover generally a parti-circular profile in front elevation. The tread-covering portion 25 extends around the tire to such a point that when the cover is in place upon the tire, and the wheel-mounted tire is mounted within the fender well 22, the lower part of the cover projects down into the fender well in slightly spaced relation with respect to the wall of the fender well so that the lower part of the cover is substantially concealed therein. As will become obvious hereinafter, the cover assumes such a form-fit relation to the tire that the tire supports and holds the cover in the foregoing well-wall-spaced position normally under all automobile-operating conditions.

Now referring particularly to the cover and its novel structural characteristics, it will be obvious from the drawings that it has approximately the same transverse and circumferential curvatures as the tire to which it is suited. According to our invention, the cover is a unitary structure formed of slightly flexible metal, which may, preferably, be comparatively heavy stock sheet metal, or the like. By "unitary" we mean a cover which is formed, in effect, as one piece, being formed from either a single piece of metal or a plurality of pieces of metal rigidly and securely joined together the same in action and effect as if formed from a single piece.

To illustrate our invention, we have chosen, as a form preferably from manufacturing standpoints, a cover built-up from two pieces of similar metal individually shaped and provided with marginal overlapping ribs 27 and 28 permanently secured together in any suitable manner so that the joined pieces to all intents and purposes are the same as a single piece of metal. By thus separately forming the two pieces, the manufacture of the cover is greatly facilitated, at the same time gaining the advantages of single-piece construction.

According to our invention, the cover is shaped to fit the tire in such a way that it cannot be removed from the tire or placed thereon except by distorting the cover twist-wise by flexing movement of the cover generated at one end only thereof. More particularly, the transverse curvature of the tread-covering portion 25 approximates the transverse curvature of the tire and has sufficient length as to project the inner or free edge 25a of such tread portion inwardly of and considerably below the maximum tread diameter of the tire as indicated at D. The edge 25a approaches closely to the surface of the tire regardless whether it be of the so-called square-tread type (indicated at S) or the so-called round-tread type (indicated at R) as illustrated in Fig. 5. As above mentioned, the tread portion 25, in circumferential direction, is parti-circular with both of its ends projecting considerably below the diameter of the tire. The diameter of the free edge 24a of the front portion 24 is approximately the same as the inside diameter of the tire so that it projects substantially to, but leaves exposed the wheel rim structure 39. The transverse curvature of the front portion 24 is also approximately the same as the curvature of the adjacent portion of the tire. With the curvature relationship of the cover as a whole as above described, it appears that, in the case of the square-tread type of tire S, the cover will contact circumferentially at approximately the positions indicated at X, Y and Z; while in the case of the round-tread type of tire R, the cover may contact circumferentially at substantially the points indicated at X and XX in Fig. 5. These points of contact may vary somewhat in different tires but, in all cases, the transverse and circumferential curvatures of the cover are such that the cover seats upon the tire at two or more transversely-spaced points circumferentially of the cover. As clearly shown in Fig. 5, the tread portion of the cover closely fits the tire on both sides of the circumferential center line of the tire tread.

With the foregoing construction, due to the diameter of the tread edge 25a being considerably less than the diameter of the tread of the tire, and the shape of such edge bringing it in close-fit relationship with respect to the tire, the cover cannot, normally, be removed from the tire by merely sliding it bodily as a whole in a direction substantially parallel with the axis of the tire. Also, since the ends of the tread-covering portion project considerably below the diameter of the tire and such ends seat against the tire, the cover cannot be removed from the tire merely by movement of the cover bodily as a whole in a direction substantially parallel with the plane of the face of the tire. In other words, a cover constructed in accordance with my invention, inherently, due to the shape above described, has the ability to self-fasten itself upon the tire without the use of separate or additional fastening means.

The slight flexibility afforded by the metal from which the cover is formed, however, permits of sufficient distortion of the cover in a peculiar way according to our invention for removal of the same from, or its placement on the tire. Specifically, the cover when fully seated upon the tire normally assumes the position shown in companion Figs. 8 and 9, with the cover snugly engaging the tire. To remove the cover, the free inward edge of its end 29 is grasped and flexed upwardly and outwardly by pressure applied in a direction diagonally-upward with respect to the plane of the front face of the tire. To facilitate the movement of this end, we provide a finger hook 30 which is secured to the extreme end edge where pressure is to be applied. When pressure is first applied, as stated, the narrow bottom part 31 of the front face 24, which bridges, so to speak, the ends 29 and 32 of the tread portion 25, flexes inwardly toward and tends to seat against the adjacent surface of the tire face. During that preliminary movement, the end 32 of the cover remains in substantially its normal position against the tire and, shifting thereof, if any, is very slight.

As one continues to apply pressure diagonally-upward as described, the edge of the cover end supporting the hook 30 slides up and slightly over the tire tread, the cover taking a twist-wise or spiral-like shape approximately as illustrated in Fig. 11. The other end 32 of the cover as illustrated in Fig. 10 is but slightly moved from its original position and serves as the point about which the cover is distorted, as illustrated.

A still further advanced stage of removal is illustrated in companion Figs. 12 and 13, the diagonally-upward pressure having been continued at the cover end 29 so that the inner edge 25ª has slid farther outward and over the tread portion and is progressively sliding over such tread portion from the end 29 toward the end 32. As will be noted in these figures, the cover is still distorted twist-wise and the end 32 is still serving as a seat for this movement. As this action continues (see companion Figs. 14 and 15), the cover finally and progressively slides over the tread until its edge supporting the hook 30 is clear thereof when the cover may be readily lifted as a whole from the tire.

The rear end of the inner edge of the cover is preferably cut obliquely, as at 38, in order that the hook may be more conveniently placed for seizure at the point of greatest flexure, and to reduce somewhat the extent to which it is necessary to raise this point to remove the cover.

It is understood that in applying the cover to the tire the action is the reverse of that which occurs in removing the cover. Both the application and removal of the cover are surprisingly easy, requiring but little physical effort notwithstanding that normally the cover snugly hugs the tire so that it is self-securing thereon without rattle or accidental movement. Actual operation of tire covers embodying our invention has demonstrated to the wonder of those witnessing the demonstration that the cover cannot be removed by gripping it between its ends and the only way it may be removed is by the twisting-like movement generated from one of its ends as above described.

For facilitating standard production and manufacture, the covers are sized, respectively, according to standard sizes of tires so that a certain size cover will suitably fit its particular size tire. However, as the tire is used and its tread portion becomes worn, or in the event that the tire is not properly inflated, the cover may not seat quite as firmly as desired; and while it may still self-secure itself upon the tire it may fit in such a way as to tend to shift upon the tire and possibly cause undesirable noise and discomfort to the automobile operator. Under such circumstances, if desired, an adjustable back bar structure such as shown in Fig. 6 may be used. Specifically, to accommodate such arrangement, the edge 25ª of the cover tread portion may be provided at approximately diametrically opposed points with slightly enlarged openings 33 adapted to receive the ends of an adjustable bar 34. The ends 34ª of this bar are, preferably, turned inwardly toward the cover at approximately right angles and are annularly grooved as at 35 providing heads 36 of slightly less dimension than the cover openings 33. The rod 34 is formed in two sections adjustably connected by a turn buckle device 37; and, when the ends of the rod are inserted in the cover openings as shown in Fig. 7 and its two sections drawn together by adjustment of the turn buckle 37, the opposed portions of the inner cover edge 25ª are drawn closer together, tending to reduce the diameter of that edge and bring the cover tread portion and its edge portion 25ª into closer fitting relation to the tire.

It is now apparent that our invention is admirably adapted to accomplish the objects first above stated. While we have shown and described only one form of our invention, it will be understood that other changes in details and arrangement of parts may be made without departing from the spirit and scope of our invention as defined by the claims which follow. (The word "diameter" as used herein is intended to define a line passing through the center of the tire with its ends above the ends of the cover).

We claim:

1. In a tire cover, a body of substantially form-retaining material having a completely circular front face-covering portion and an integral, parti-circular tread-covering portion, said tread-covering portion being formed in cross-section to fit over the tire tread with its free edge extending substantially beyond the circumferential center line of the tire and in close proximity to the rear side of such tire tread, both of the ends of said tread-covering portion projecting a substantial distance below the diameter of the tire in substantially close-fitting relation to the tire, and a substantially rigid, adjustable member engaging the free edge of said tread-covering portion adjacent diametrically opposed points of the tire for positively securing the free edge of said tread portion in close-fit relation to the adjacent tire surface.

2. In combination with an automobile fender-well for receiving a part of a spare tire, a sheet metal tire cover body having a tread-covering portion of sufficient width and so shaped as to pass over the tread of the tire and down over the rear and front of the tire tread to each side of the center line thereof in substantially close-fitting relation thereto, said tread-covering portion extending only partway around the tire with its ends disposed substantially below the diameter of the tire and extending into the mouth of the well, the material of said body being sufficiently flexible to permit twist-distortion of said cover by twist-movement of one of said tread-covering portion ends relative to the other, said one end being cut away obliquely at its rearward corner so that it projects out of the well and free thereof when the cover is in proper tire protecting position to enable said corner to be grasped and flexed forwardly and upwardly free of the well without interference from the well.

3. In combination with an automobile fender-well for receiving a part of a spare tire, a sheet metal tire cover body having a tread-covering portion of sufficient width and so shaped as to pass over the tread of the tire and down over the rear and front of the tire tread to each side of the center line thereof in substantially close-fitting relation thereto, said tread-covering portion extending only partway around the tire with its ends disposed substantially below the diameter of the tire and extending into the mouth of the well, the material of said body being sufficiently flexible to permit twist-distortion of said cover by twist-movement of one of said tread-covering portion ends relative to the other, said one end being cut away obliquely at its rearward corner so that it projects out of the well and free thereof when the cover is in proper tire protecting position to enable said corner to be grasped and flexed forwardly and upwardly free of the well without interference from the well, and a finger grip carried adjacent the rearward edge of said cutaway end portion to be actuated to move said one end relative to said other end.

4. In a tire cover, a body of substantially form-retaining material having a completely circular front face-covering portion and an integral, parti-circular tread-covering portion, said tread-covering portion being formed in cross-section to fit over the tire tread with its free edge extending substantially beyond the circumferential center line of the tire and in close proximity to the rear side of such tire tread, both of the ends of said tread-covering portion projecting a substantial distance below the diameter of the tire in substantially close-fitting relation to the tire, and a substantially rigid, adjustable member engaging the free edge of said tread-covering portion adjacent diametrically opposed points of the tire for positively securing the free edge of said tread portion in close-fit relation to the adjacent tire surface, and means affording a releasable connection between said member and said free edge to enable said member to be removed when it is desired to remove the cover from the tire.

5. In combination with an automobile fender-well for receiving a part of a spare tire, a cover for said tire, said cover comprising a body of substantially form-retaining material having a completely circular front face-covering portion and an integral, parti-circular tread-covering portion, said tread-covering portion being formed in cross-section to fit over the tire tread with its free edge extending substantially beyond the circumferential center line of the tire and in close proximity to the rear side of such tire tread, both of the ends of said tread-covering portion projecting a substantial distance below the diameter of the tire in substantially close-fitting relation to the tire, and a substantially rigid, adjustable member engaging the free edge of said tread-covering portion adjacent diametrically opposed points of the tire for positively securing the free edge of said tread portion in close-fit relation to the adjacent tire surface, said member being disposed out of the mouth of the well to be readily accessible for adjustment without removing the tire from the well.

6. In combination with an automobile fender-well for receiving a part of a spare tire, a cover for said tire, said cover comprising a body of substantially form-retaining material having a completely circular front face-covering portion and an integral, parti-circular tread-covering portion, said tread-covering portion being formed in cross-section to fit over the tire tread with its free edge extending substantially beyond the circumferential center line of the tire and in close proximity to the rear side of such tire tread, both of the ends of said tread-covering portion projecting a substantial distance below the diameter of the tire in substantially close-fitting relation to the tire, and a substantially rigid, adjustable member engaging the free edge of said tread-covering portion adjacent diametrically opposed points of the tire for positively securing the free edge of said tread portion in close-fit relation to the adjacent tire surface, means affording a releasable connection between said member and the free edge to enable the member to be removed when it is desired to remove the cover, said member being disposed out of the mouth of the well to be readily accessible for adjustment or removal, as desired, without removing the tire from the well.

7. In a tire cover for a spare tire in a fender well, an arcuate tread covering portion of relatively rigid material extending around substantially more than one-half of the tire circumference with its ends arranged to extend in the well, said portion having one end cut away obliquely at its rearward corner so as to enable said end to be grasped to twist the tread covering portion upwardly off the tire.

8. In a tire cover for a spare tire in a fender well, an arcuate tread covering portion of relatively rigid material extending around substantially more than one-half of the tire circumference with its ends arranged to extend in the well, said portion having one end cut away obliquely at its rearward corner so as to enable said end to be grasped to twist the tread covering portion upwardly off the tire, and a relatively continuous inwardly extending side wall portion for disposition over an outer side wall of a tire formed integral with the tread covering portion and adapted to have its lower portion project into the fender well.

FREDERICK D. HANSEN.
HERBERT W. TINKER.